United States Patent
Higuchi et al.

(10) Patent No.: US 8,208,435 B2
(45) Date of Patent: Jun. 26, 2012

(54) BASE STATION APPARATUS, USER APPARATUS AND METHOD FOR USE IN MOBILE COMMUNICATION SYSTEM

(75) Inventors: Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 466 days.

(21) Appl. No.: 12/526,519

(22) PCT Filed: Feb. 8, 2008

(86) PCT No.: PCT/JP2008/052148
§ 371 (c)(1),
(2), (4) Date: Oct. 13, 2009

(87) PCT Pub. No.: WO2008/099783
PCT Pub. Date: Aug. 21, 2008

(65) Prior Publication Data
US 2010/0027496 A1   Feb. 4, 2010

(30) Foreign Application Priority Data
Feb. 14, 2007   (JP) .................................. 2007-034132

(51) Int. Cl.
*H04W 4/00* (2009.01)
(52) U.S. Cl. ......... 370/329; 370/331; 370/334; 370/339
(58) Field of Classification Search .................. 370/329, 370/331, 334, 339
See application file for complete search history.

(56) References Cited

U.S. PATENT DOCUMENTS

| | | | | |
|---|---|---|---|---|
| 8,045,638 | B2* | 10/2011 | Grant et al. | 375/267 |
| 8,046,029 | B2* | 10/2011 | Teo et al. | 455/562.1 |
| 2002/0068611 | A1* | 6/2002 | Kogiantis et al. | 455/562 |
| 2006/0079221 | A1* | 4/2006 | Grant et al. | 455/423 |
| 2007/0286124 | A1* | 12/2007 | Grant et al. | 370/331 |
| 2008/0051149 | A1* | 2/2008 | Mehta et al. | 455/562.1 |
| 2008/0214185 | A1* | 9/2008 | Cho et al. | 455/424 |
| 2010/0014473 | A1* | 1/2010 | Ofuji et al. | 370/329 |

FOREIGN PATENT DOCUMENTS

| | | |
|---|---|---|
| JP | 9-238098 A | 9/1997 |
| WO | 02/091625 A1 | 11/2002 |

OTHER PUBLICATIONS

International Search Report w/translation from PCT/JP2008/052148 dated May 13, 2008 (2 pages).
Written Opinion from PCT/JP2008/052148 dated May 13, 2008 (3 pages).
3GPP TSG RAN WG1 Meeting #47bis; R1-070097; "Performance Evaluation of Closed Loop-Based Antenna Switching Transmit Diversity in E-UTRA Uplink"; Sorrento, Italy, Jan. 15-19, 2007 (7 pages).

* cited by examiner

*Primary Examiner* — Kenny Lin
(74) *Attorney, Agent, or Firm* — Osha • Liang LLP

(57) ABSTRACT

A base station apparatus includes a storage unit configured to store quality information indicative of channel states for different transmit antennas of a user apparatus over a predefined frequency band including multiple resource units, a scheduling unit configured to generate scheduling information indicative of assignment of resource units from the quality information, and a transmitting unit configured to transmit a lower layer control signal including scheduling information and antenna selection information to the user apparatus. The antenna selection information is configured to indicate which of the transmit antennas of the user apparatus is to be used for transmissions. The scheduling information and the antenna selection information are channel encoded together.

7 Claims, 6 Drawing Sheets

FIG.4

| | TRANSMIT ANTENNA | RU1 | RU2 | · · · |
|---|---|---|---|---|
| UE1 | #1 | $CQI_{11}$ | $CQI_{12}$ | · · · |
| | #2 | $CQI_{21}$ | $CQI_{22}$ | |
| UE2 | #1 | $CQI_{11}$ | $CQI_{12}$ | · · · |
| | #2 | $CQI_{21}$ | $CQI_{22}$ | |
| | #3 | $CQI_{31}$ | $CQI_{32}$ | |
| | #4 | $CQI_{41}$ | $CQI_{42}$ | |
| UE3 | #1 | $CQI_{11}$ | $CQI_{12}$ | · · · |
| ⋮ | ⋮ | ⋮ | ⋮ | |

BASE STATION APPARATUS, USER APPARATUS AND METHOD FOR USE IN MOBILE COMMUNICATION SYSTEM

TECHNICAL FIELD

The present invention relates to the technical field of mobile communication, and more particularly relates to base station apparatuses, user apparatuses and methods for use in mobile communication systems utilizing closed-loop type ASTD (Antenna Switching Transmit Diversity).

BACKGROUND ART

In a mobile communication system, transmit diversity may be used by providing multiple transmit antennas to a communication apparatus for improved transmission quality. There are two types of transmit diversity, open-loop type transmit diversity and closed-loop type transmit diversity. In the open-loop type of transmit diversity, the transmit antennas are selectively used in accordance with a predefined selection pattern. In the closed-loop type of transmit diversity, an appropriate one of the transmit antennas is selected in accordance with feedback from communication opponents.

FIG. 1 illustrates an exemplary application of the closed-loop type of transmit diversity to uplinks. First, it is determined whether respective transmit antennas have good channel states based on reference signals transmitted from the respective transmit antennas. The quality of the channel state may be represented in a channel quality indicator (CQI), for example. Then, a transmit antenna associated with a better channel state is determined, and the determination is fed back to the transmitter as antenna selection information.

FIG. 2 illustrates an exemplary transmission of reference signals and data signals from two different transmit antennas in the case where a user apparatus includes the transmit antennas. The data signals are transmitted from a transmit antenna with a better channel state. As a rule, the reference signals are transmitted from the same transmit antenna as the data signals, but at a certain cycle, the reference signals are transmitted from a transmit antenna different from the data signals. For example, the reference signals may be transmitted via the same transmit antenna as the data signals in the first through third subframes of four subframes while the reference signals may be transmitted via a transmit antenna different from the data signals in the fourth subframe. This makes it possible to select an appropriate one of the transmit antennas under reliable comprehension of transmission conditions on the respective transmit antennas.

For example, the closed-type ASTD for uplink transmissions is disclosed in 3GPP, TSG RAN WG1 Meeting#47bis, R1-070097, January 2007.

DISCLOSURE OF INVENTION

Problem to be Solved by the Invention

The antenna selection information indicating which of the multiple transmit antennas should be used may be represented in a relatively smaller number of bits. For example, at most two bits may be required to represent four antennas, and three bits may be required to represent eight antennas. More generally, $\log_2 N$ bits may be required to represent N antennas. This may be preferable for reduction in informational amounts of downlink control signals and thereby in overhead but may not be preferable in terms of error correction. This is why even if error correction coding is performed on the antenna selection information, no sufficient coding gain can be achieved. There is a risk that an error rate of the antenna selection information may become higher depending on communication state. In particular, since user apparatuses locating at cell boundaries may have a poor channel state, the antenna selection information may particularly tend to be erroneous for these user apparatuses. For this reason, even if antenna diversity is used, the communication quality may not be improved.

One object of the present invention is to improve the error rate of the antenna selection information transmitted from a base station apparatus to a user apparatus in the closed-type ASTD.

Means for Solving the Problem

A base station apparatus according to one feature of the present invention includes a storage unit configured to store quality information indicative of channel states for different transmit antennas of a user apparatus over a predefined frequency band including multiple resource units, a scheduling unit configured to generate scheduling information indicative of assignment of resource units from the quality information, and a transmitting unit configured to transmit a lower layer control signal including scheduling information and antenna selection information to the user apparatus. The antenna selection information is configured to indicate which of the transmit antennas of the user apparatus is to be used for transmissions. The scheduling information and the antenna selection information are channel encoded together.

Advantage of the Invention

According to the embodiments of the present invention, it is possible to improve the error rate of the antenna selection information transmitted from a base station apparatus to a user apparatus in the closed-type ASTD.

BRIEF DESCRIPTION OF DRAWINGS

FIG. 4 schematically illustrates CQIs for resource units for transmit antennas of user apparatuses;

LIST OF REFERENCE SYMBOLS

Figure 1:
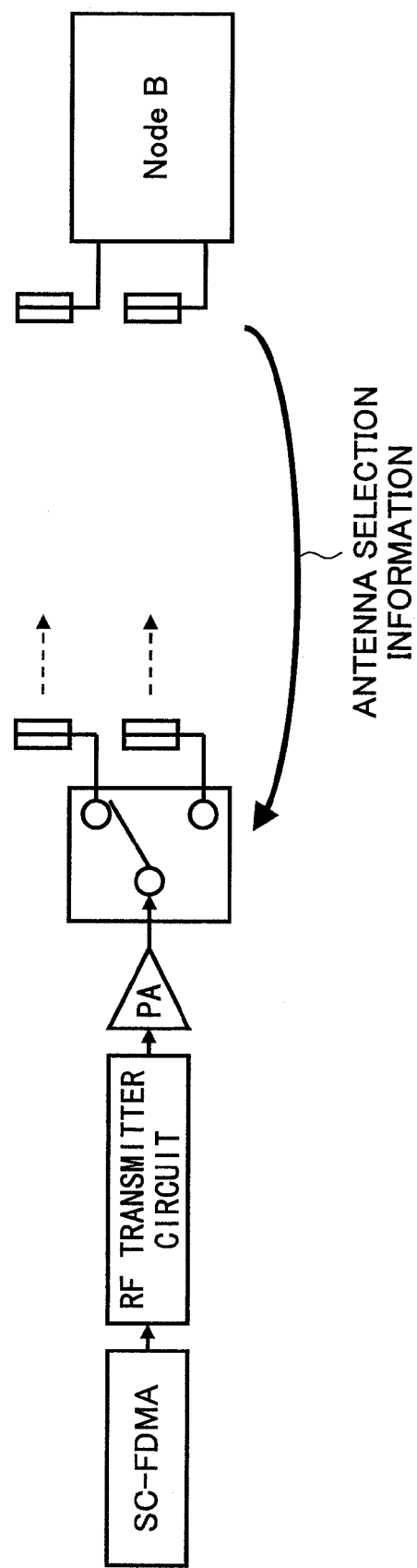
FIG. 1 schematically illustrates an exemplary application of the closed-type ASTD.
Figure 2:
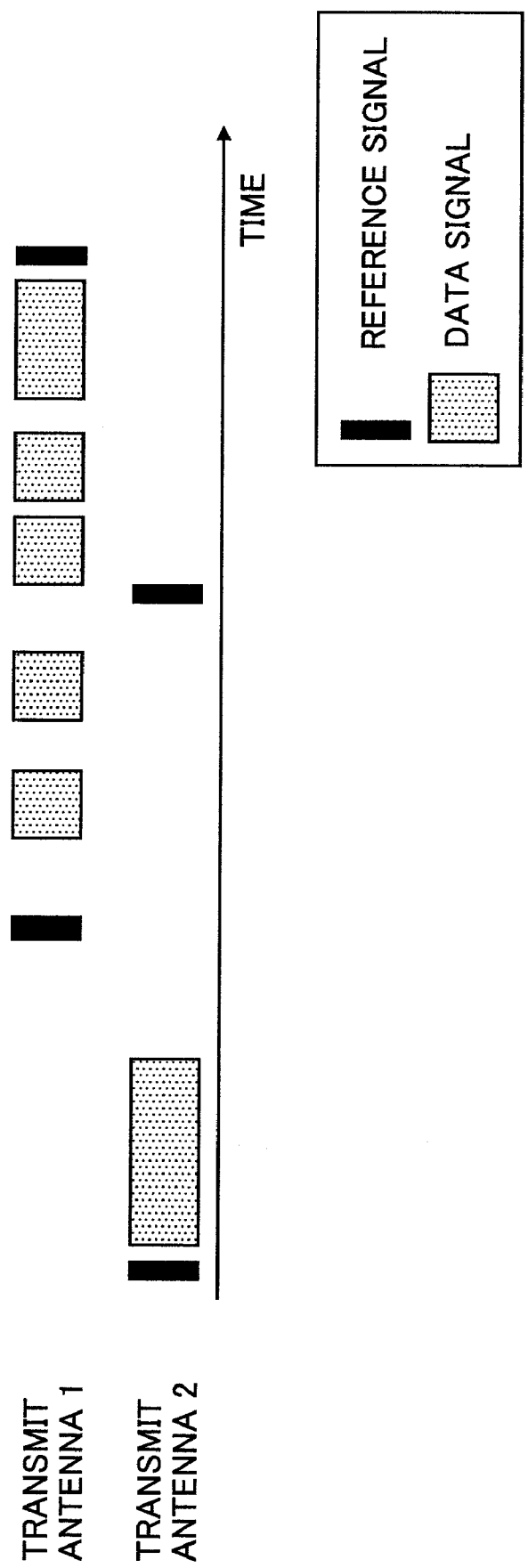
FIG. 2 schematically illustrates exemplary switching between two transmit antennas.

302: transmit symbol generation unit
304: discrete Fourier transform unit
306: subcarrier mapping unit
308: inverse fast Fourier transform unit
310: cyclic prefix addition unit
312: reference signal generation unit
314: multiplexing unit
316: RF transmitter circuit
318: power amplifier
320: transmit antenna selection unit
322: L1/L2 control signal demodulation unit
330: transmit power control unit 420: reference signal generation unit
422: CQI measurement unit
424: scheduler
426: L1/L2 control signal generation unit
430: data signal generation unit
436: multiplexing unit
438: inverse fast Fourier transform unit
440: cyclic prefix addition unit
442: RF transmitter circuit
444: power amplifier

BEST MODE FOR CARRYING OUT THE INVENTION

Figure 3:
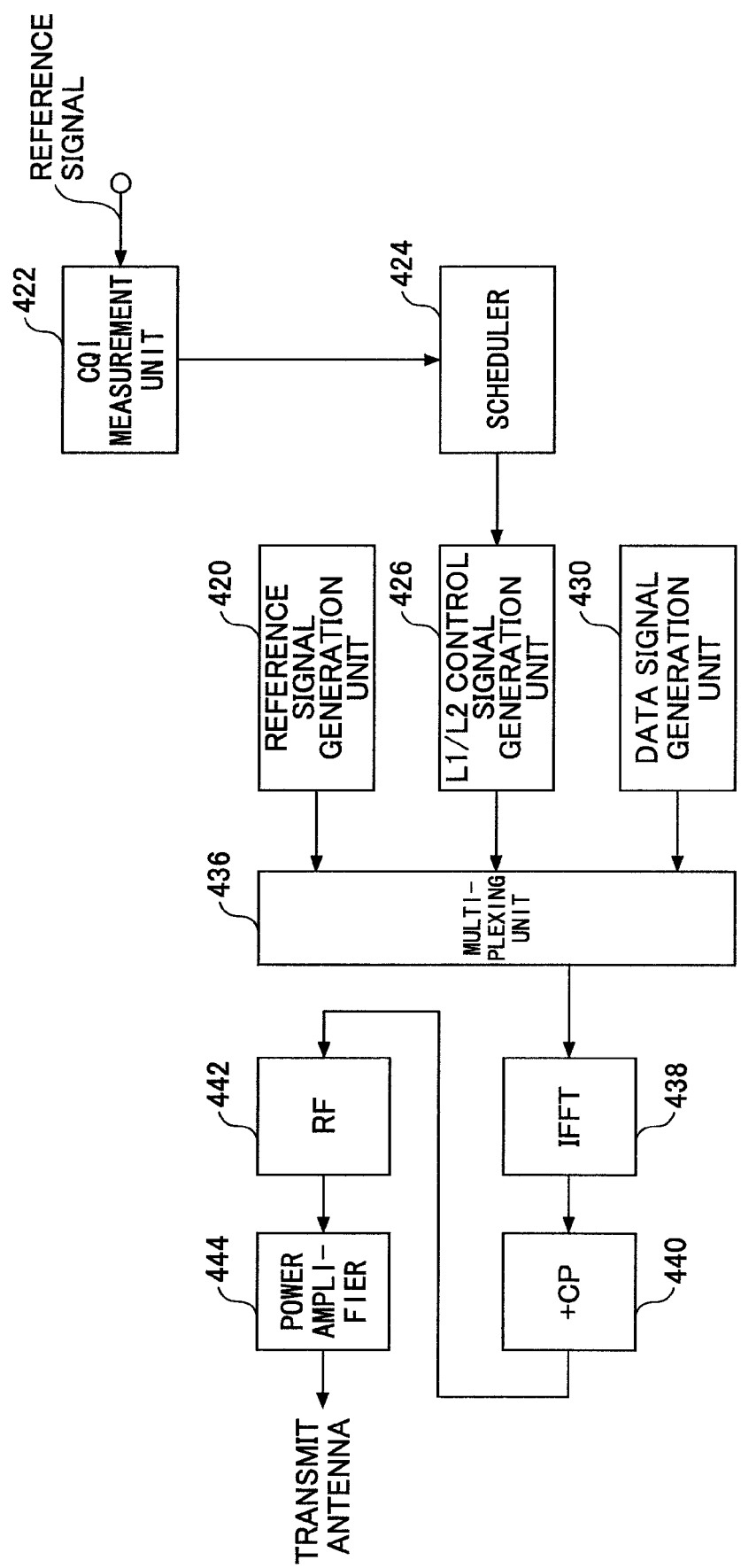
FIG. 3 is a block diagram illustrating a base station according to one embodiment of the present invention.

FIG. 3 illustrates a base station according to one embodiment of the present invention. In FIG. 3, a reference signal generation unit 420, a CQI measurement unit 422, a scheduler 424, a L1/L2 control signal generation unit 426, a data signal generation unit 430, a multiplexing unit 436, an inverse fast Fourier transform (IFFT) unit 438, a cyclic prefix addition (+CP) unit 440, a RF transmitter circuit 442 and a power amplifier 444 are illustrated.

The reference signal generation unit 420 generates reference signals for downlink transmissions. The reference signal may be referred to as a pilot signal or a training signal and include information already known at the transmitter and receiver sides before initiation of communication.

The CQI measurement unit 422 evaluates channel states (CQI) on user apparatuses based on quality measurement reference signals received from the user apparatuses. The quality measurement reference signals may be referred to as sounding reference signals and are periodically transmitted in uplinks. The sounding reference signals are transmitted in bands wider than reference signals for demodulation or channel compensation used in a channel estimation unit. The reference signal used for channel compensation may occupy a band over an actually assigned resource block. On the other hand, the sounding reference signal has to occupy a band over all resource blocks, because the sounding reference signal is used for quality measurement serving as a basis of scheduling. The term "resource block (RB)" used herein is equivalent to the term "resource unit (RU)" and means a frequency band unit assigned in transmissions of a shared data channel. In this embodiment, the channel state (CQI) is evaluated or estimated on a per-RU basis for each transmit antenna of a user apparatus.

FIG. 4 schematically illustrates exemplary storage in a memory of CQIs on respective resource units for transmit antennas of user apparatuses. In the illustration, the first user apparatus UE1 has two transmit antennas, the second user apparatus UE2 has four transmit antennas, and the third user apparatus UE3 has only one transmit antenna. RU1, RU2, . . . represent resource units.

In FIG. 3, the scheduler 424 determines the assignment of uplink and downlink resources based on the channel state (CQI) or other criteria, for example, a fairness criterion such as an amount of accumulation in a transmit buffer. The determined assignment is supplied as scheduling information. For example, the scheduling information may include information items as follow:
  information indicating which resource unit is used for signal transmission (resource unit assignment information);
  user identification information;
  transmit format information (data modulation scheme and channel coding ratio or data size); and
  transmit power information.

In addition to these scheduling information items, the scheduler 424 generates antenna selection information indicating which transmit antenna of a user apparatus is to be used for transmissions. For example, it is assumed that the resource unit RU1 is assigned to the user apparatus UE1 and the resource unit RU2 is assigned to the user apparatus UE2 in terms of the CQI as illustrated in bold blocks. In this case, the antenna selection information for the user apparatus UE1 indicates the second transmit antenna, and the antenna selection information for the user apparatus UE2 indicates the third transmit antenna.

The L1/L2 control signal generation unit 426 generates L1/L2 control signals through operations such as channel coding and data modulation on control information to be transmitted. The L1/L2 control signal may include the above-stated scheduling information as well as the antenna selection information. Generally, the L1/L2 control signal is transmitted to a user apparatus on a per-subframe basis. However, the whole antenna selection information for a certain user apparatus does not have to be transmitted in a single L1/L2 control signal. The antenna selection information may be transmitted to the certain user apparatus in multiple L1/L2 control signals. For example, for the antenna selection information represented in two bits, the first bit may be transmitted in the first subframe, and the second bit may be transmitted in the second subframe. The L1/L2 control signal (lower layer control signal) is transmitted separately from a data signal for separation from a higher layer control signal, such as a L3PPC message or a MAC control PDU, transmitted as a part of the data signal.

As stated above, since the antenna selection information may be represented in a relatively small number of bits itself, it may be hard to achieve greater coding gain for error correction coding. In this embodiment, the antenna selection information is channel encoded or error correction encoded together with the scheduling information. The antenna selection information is not encoded separately from other information items such as scheduling information. A signal including the scheduling information and the antenna selection information is configured as one coding unit for error correction coding. As the coding scheme, Viterbi coding scheme, convolution coding scheme, Turbo coding scheme and any other appropriate coding schemes well known in the art may be utilized. According to this embodiment, the coding information unit becomes longer, and thus coding gain can be improved accordingly. In particular, the coding gain for the antenna selection information can be improved.

Meanwhile, various user apparatuses may operate in a cell under various environments. Some user apparatuses may require the antenna selection information while other user apparatuses may not require the antenna selection information. For transmissions of the scheduling information, several schemes may be conceived depending on whether to separate the user apparatuses.

(1) First, different transmit formats may be used depending on whether the antenna selection information is required. For convenience of explanation, it is assumed that user A requires the antenna selection information and user B does not require the antenna selection information. Also, it is assumed that the number of bits of the antenna selection information is equal to m. In the scheme (1), the scheduling information for the user A and the scheduling information for the user B are represented in K bits. However, the coding unit (K) consists of only the scheduling information for the user A while the coding unit consists of a signal (K+m) with a greater number of bits including the scheduling information and the antenna selection information for the user B. According to this scheme, if the antenna selection information is unnecessary, the number of bits already provided for the scheduling information can be maintained, which can maintain exiting equipment and operations.

(2) Alternatively, different transmit formats may be used depending on whether the antenna selection information is required. In this scheme, the scheduling information for the user A is represented in K bits while the scheduling information for the user B is represented in (k−m) bits. As a result, according to the scheme, the coding unit can be maintained in K bits. regardless of necessity of the antenna selection information. The K bits are used for the user A, and the K bits (=(K−m) bits+m bits) are used as the coding unit for the user B.

The number of bits for resource unit assignment information, transmit format information (data modulation scheme and channel coding rate or data size) and transmit power information in the scheduling information may be reduced for the antenna selection information. If some bits are reduced, a smaller number of options can be represented in the information.

However, users requiring control using the antenna selection information may be communicating in environments with a poor channel state such as cell boundaries, and thus even if some options that are enabled only in a good channel state are ignored, the users may not be actually influenced. For example, for the resource unit assignment information, a combination of resource units assigned in the case of an extremely good channel state, such as a combination of many resource units, may be unnecessary for users with poor channel states. Also for the transmit format, MCS numbers only used in the case of an extremely good channel state may be unnecessary for users with poor channel states. Also for the transmit power, a weak transmit power only used in the case of an extremely good channel state may not be used for users with poor channel states. Thus, even if a smaller number of options can be represented in the scheduling information, users using the antenna selection information may not be actually influenced. For both of the user A that requires the antenna selection information and the user B that does not require the antenna selection information, the coding unit of K bits is uniformly used. As a result, multiple transmit formats for the L1/L2 control signals do not have to be provided, resulting in simplified operations.

On the other hand, in the case where a smaller number of bits are provided for the scheduling information, some modifications can be designed to prevent reduction in options for resource unit assignment and others. For example, instead of the whole resource unit assignment information, only differences between the current resource unit assignment information and the previous resource unit assignment information may be represented. In this case, reduction in the number of options can be prevented.

The data signal generation unit 430 uses shared data channels to generate data signals through operations such as channel coding and data modulation.

The multiplexing unit 436 multiplexes signals to transmit reference signals, L1/L2 control signals and data signals to user apparatuses residing in a cell of the base station. The multiplexing may be carried out through one or more of time division multiplexing, frequency division multiplexing and code division multiplexing.

The inverse fast Fourier transform (IFFT) unit 438 performs inverse fast Fourier transform on mapped signals and modulates the resulting signals in accordance with an OFDM scheme to generate an effective symbol portion in a transmitted symbol.

The cyclic prefix addition unit (+CP) 440 adds guard intervals to the signals (the effective symbol portions at this stage) modulated in accordance with the OFDM scheme to generate OFDM symbols serving as constituents of transmitted signals. The signals are wirelessly transmitted via some elements not illustrated. A cyclic prefix may be referred to as a guard interval and can be generated through duplication of a part of the effective symbols in the transmitted symbols.

The RF transmitter circuit 442 performs some operations such as digital-to-analog conversion, frequency conversion and band limitation to transmit the symbols in radio frequencies.

The power amplifier 444 adjusts transmit power.

Figure 5:
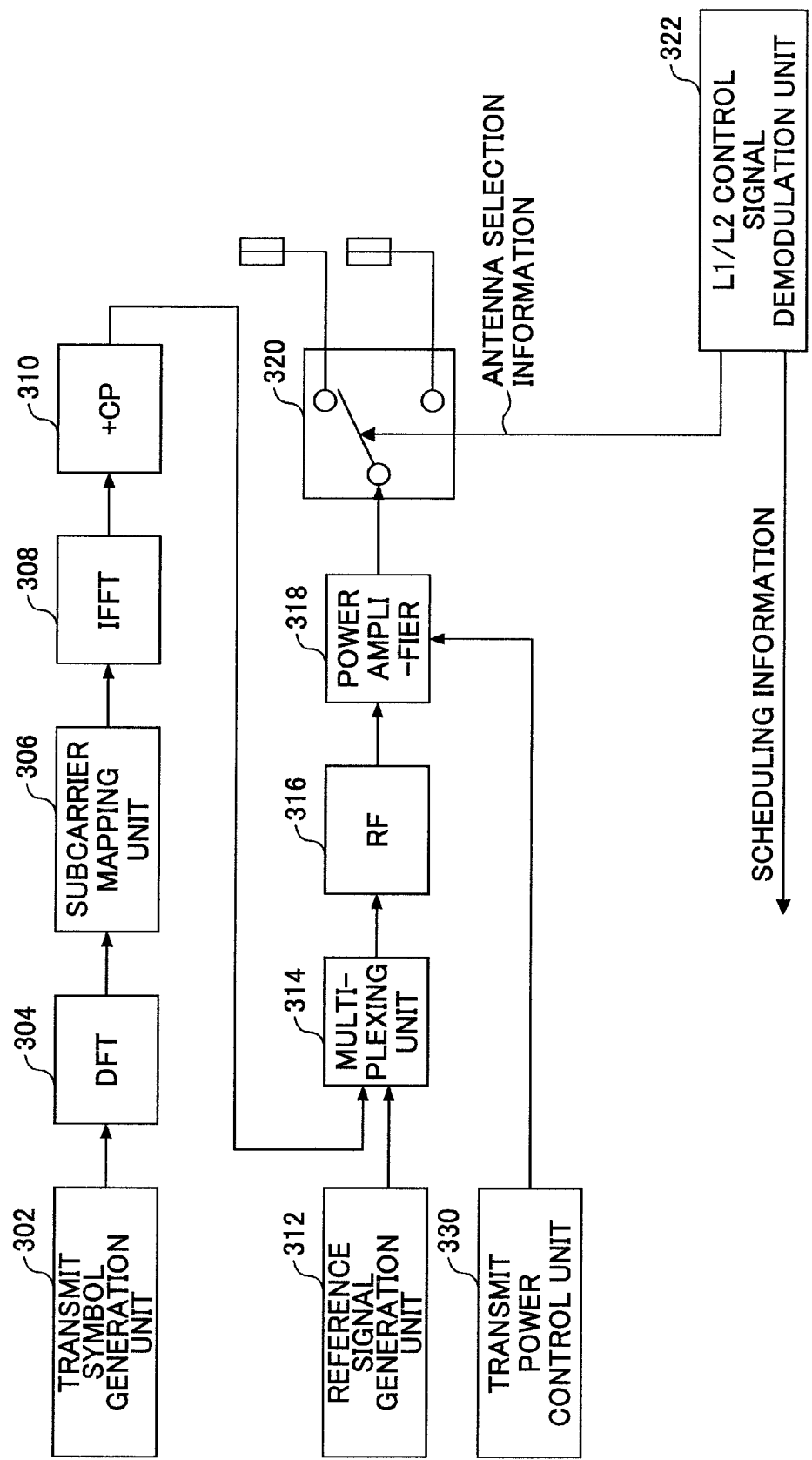
FIG. 5 is a block diagram illustrating a user apparatus according to one embodiment of the present invention.

FIG. 5 is a functional block diagram illustrating a user apparatus according to one embodiment of the present invention. It is assumed that the user apparatus is used in a mobile communication system where a single-carrier scheme is applied to uplinks. In FIG. 5, a transmit symbol generation unit 302, a discrete Fourier transform (DFT) unit 304, a subcarrier mapping unit 306, an inverse fast Fourier transform (IFFT) unit 308, a cyclic prefix addition (+CP) unit 310, a reference signal generation unit 312, a multiplexing unit 314, a RF transmitter circuit 316, a power amplifier 318, a transmit antenna selection unit 320, a L1/L2 control signal demodulation unit 322 and a transmit power control unit 330 are illustrated.

The transmit symbol generation unit 302 generates a signal to be transmitted in uplinks. The transmit symbol generation unit 302 generates not only user traffic data signals to be transmitted by a user but also control signals. The control signals may include a transmit format (modulation scheme, data size and/or others) for uplink data signals, uplink transmit power, acknowledgement information (ACK/NACK) for downlink data signals, downlink reception quality (CQI) and/or others.

The discrete Fourier transform (DFT) unit 304 performs discrete Fourier transform to convert time-series information into frequency domain information.

The subcarrier mapping unit 306 performs mapping in frequency domains. A frequency division multiplexing (FDM) scheme may be used to multiplex multiple user apparatuses. The FDM scheme includes two types of schemes, localized FDM scheme and distributed FDM scheme.

The inverse fast Fourier transform (IFFT) unit 308 performs inverse Fourier transform to inversely convert frequency domain signals into time domain signals.

The cyclic prefix addition (+CP) unit 310 adds cyclic prefixes to information to be transmitted. The cyclic prefix (CP) serves as guard intervals for absorbing multipath propagation delay and differences between reception timings of multiple users at a base station.

The reference signal generation unit 312 generates reference signals to be transmitted in uplinks.

The multiplexing unit 314 multiplexes reference signals into the information to be transmitted to generate transmit symbols.

The RF transmitter circuit 316 performs some operations such as digital-to-analog conversion, frequency conversion and band limitation to transmit the transmit symbols in radio frequencies.

The power amplifier 318 adjusts transmit power in accordance with instruction from the transmit power control unit 330.

The transmit power control unit 330 controls the transmit power of the transmitted signals in accordance with instruction from the base station (transmit power control information in scheduling information).

The transmit antenna selection unit 320 switches between transmit antennas in accordance with antenna selection information transmitted from the base station and predefined rules. The predefined rules may include a rule "Data signals are transmitted from a transmit antenna selected in accordance with antenna selection information. Reference signals are transmitted from a transmit antenna unused to transmit the data signals for subframes corresponding to a certain cycle and from a transmit antenna used to transmit the data signals for the other subframes."

The L1/L2 control signal demodulation unit 322 channel decodes and data demodulates L1/L2 control signals received from a base station and extracts control information. Particularly in this embodiment, the channel decoding and data demodulation are performed depending on the channel coding scheme and data modulation scheme applied at the base station to derive scheduling information and antenna selection information. As stated above, the antenna selection information together with the scheduling information is encoded and transmitted. Thus, the antenna selection information and the scheduling information are channel decoded together rather than separately from each other.

From the extracted scheduling information, resource unit assignment information indicative of resource units, user identification information, transmit format information (data modulation scheme and channel coding rate or data size), transmit power information and/or others are derived, and reception of downlink signals and/or transmission of uplink signals are carried out in accordance with these information items. In this case, used antennas (particularly transmit antennas) are selected in accordance with the antenna selection information.

Figure 6:
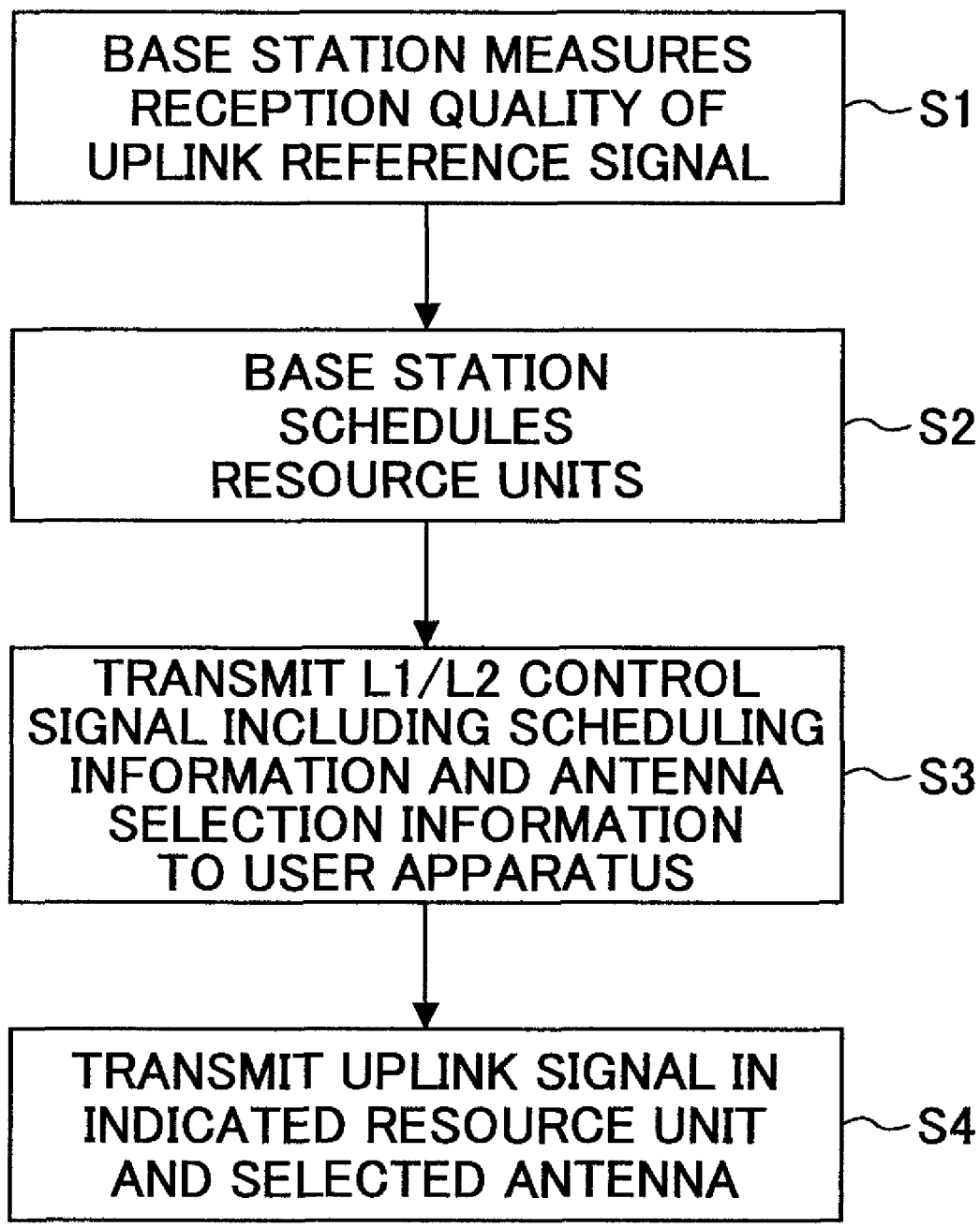
FIG. 6 is a flowchart illustrating operations according to one embodiment of the present invention.

FIG. 6 is a flowchart of operations according to one embodiment of the present invention. At step S1, reception quality (CQI) of uplink reference signals are measured at a base station. The reception quality is determined not only for different user apparatuses but also for different transmit antennas for those user apparatuses having multiple transmit antennas. The CQI is measured over the whole band (system band) to which resource units may be assigned. As a result, as illustrated in FIG. 4, the CQIs may be determined for each resource unit for different transmit antennas of the user apparatuses.

At step S2, scheduling is carried out at the base station based on the measured CQIs. Resource units are assigned to user apparatuses with better CQIs, and antenna selection information together with the scheduling information is generated for specifying a transmit antenna.

At step S3, signals including the scheduling information and the antenna selection information are channel encoded and data modulated to generate L1/L2 control signals. The L1/L2 control signals are transmitted to the user apparatuses.

At step S4, resource unit assignment information, transmit format information and transmit power information are derived from the scheduling information, and uplink signals are transmitted in accordance with resource units, transmit formats and transmit power as specified in these information items. In transmission, transmit antennas as specified in the antenna selection information are used.

In this manner, according to one embodiment of the present invention, the antenna selection information together with the scheduling information is channel encoded and transmitted, which can improve the error rate of the antenna selection information.

The present invention have been described with reference to the specific embodiments of the present invention, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviation from the spirit of the present invention.

This international patent application is based on Japanese Priority Application No. 2007-034132 filed on Feb. 14, 2007, the entire contents of which are hereby incorporated by reference.

The invention claimed is:

1. A base station apparatus, comprising:
a storage unit configured to store quality information indicative of channel states for different transmit antennas of a user apparatus over a predefined frequency band including multiple resource units;
a scheduling unit configured to generate scheduling information indicative of assignment of resource units from the quality information; and
a transmitting unit configured to transmit a lower layer control signal including scheduling information and antenna selection information to the user apparatus, wherein
the antenna selection information is configured to indicate which of the transmit antennas of the user apparatus is to be used for transmissions, and
the scheduling information and the antenna selection information are channel encoded together.

2. The base station apparatus as claimed in claim 1, wherein the scheduling unit determines resource unit assignment information indicative of a resource unit assigned to the user apparatus, the antenna selection information, a transmit format for use in uplink transmission, and transmit power information for uplink signals.

3. The base station apparatus as claimed in claim 2, wherein the resource unit assignment information, the transmit format information and the transmit power information are represented in a number of bits, the number of bits being determined independently of whether the scheduling information is channel encoded together with the antenna selection information.

4. The base station apparatus as claimed in claim 2, wherein at least one of the resource unit assignment information, the transmit format information and the transmit power information is represented in a number of bits, the number of bits being determined depending on whether the scheduling information is channel encoded together with the antenna selection information.

5. The base station apparatus as claimed in claim 1, wherein the antenna selection information is segmented over multiple subframes and transmitted to the user apparatus.

6. A user apparatus, comprising:
a receiving unit configured to receive a lower layer control signal including scheduling information and antenna selection information from a base station apparatus;
a determination unit configured to channel decode and data demodulate the lower layer control signal and determine assignment of resource units based on the scheduling information; and a transmitting unit configured to select a transmit antenna of multiple transmit antennas in accordance with the antenna selection information and use the transmit antenna to transmit an uplink signal in the assigned resource unit, wherein the antenna selection information is included in the lower layer control signal where the antenna selection information together with the scheduling information is channel encoded.

7. A method, comprising:

generating scheduling information indicative of assignment of resource units at a base station apparatus from quality information indicative of channel states for different transmit antennas of a user apparatus over a predefined frequency band including multiple resource units;

transmitting a lower layer control signal including the scheduling information and antenna selection information to a user apparatus;

decoding and demodulating the lower layer control signal and determining assignment of resource units based on the scheduling information at the user apparatus; and selecting a transmit antenna among multiple transmit antennas in accordance with the antenna selection information and using the transmit antenna to transmit an uplink signal in the assigned resource unit, wherein the antenna selection information indicates which of the transmit antennas of the user apparatus is to be used for transmissions, and the scheduling information and the antenna selection information are channel encoded together at the base station apparatus.

* * * * *